United States Patent
Hara et al.

(10) Patent No.: US 10,664,743 B2
(45) Date of Patent: May 26, 2020

(54) MODELING A SUBJECT PROCESS BY MACHINE LEARNING WITH ADAPTIVE INPUTS

(71) Applicant: INTERNATIONAL BUSINESS MACHINES CORPORATION, Armonk, NY (US)

(72) Inventors: Ibuki Hara, Tokyo (JP); Junya Shimizu, Tokyo (JP); Michihiro Yokoyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 14/925,101

(22) Filed: Oct. 28, 2015

(65) Prior Publication Data
US 2017/0124450 A1    May 4, 2017

(51) Int. Cl.
*G06N 20/00* (2019.01)
*G06F 8/35* (2018.01)
*G06N 3/04* (2006.01)

(52) U.S. Cl.
CPC .......... *G06N 3/0454* (2013.01); *G06N 20/00* (2019.01); *G06F 8/35* (2013.01)

(58) Field of Classification Search
CPC ...... G06N 3/0454; G06N 99/005; G06N 5/04; G06N 3/08; G06N 3/0445; G06N 3/063; G06N 3/084; G06N 3/088; G06N 5/02; G06N 5/022; G06N 5/046; G06N 5/047; G06N 7/005; G05B 23/024; G05B 13/027; G05B 13/0275; G05B 13/028;
(Continued)

(56) References Cited

U.S. PATENT DOCUMENTS

| 7,406,434 B1 * | 7/2008 | Chang .............. G06Q 10/06375 705/14.1 |
| 2008/0082197 A1 * | 4/2008 | Lacaille ............. G05B 23/0232 700/121 |

(Continued)

OTHER PUBLICATIONS

Chandola, Varun, Arindam Banerjee, and Vipin Kumar. "Anomaly detection: A survey." ACM computing surveys (CSUR) 41.3 (2009): 15.*

(Continued)

*Primary Examiner* — Li B. Zhen
*Assistant Examiner* — Markus A. Vasquez
(74) *Attorney, Agent, or Firm* — Isaac I. Gooshaw, Esq.; George S. Blasiak, Esq.; Heslin Rothenberg Farley & Mesiti PC

(57) ABSTRACT

Methods, computer program products, and systems are presented. The methods include, for instance: modeling for a subject process by machine learning with adaptive inputs. In one embodiment, the modeling may include: generating a model by use of machine learning with training data from measurements of successive components of a process to be modeled in order to predict measurements of a succeeding component within a statistically meaningful prediction range; adjusting the generated model by use of machine learning with less-deviation inducing measurements from a preceding component in case the measurement of the succeeding component is out of the prediction range; and presenting the adjusted model as a prediction model for the process.

20 Claims, 7 Drawing Sheets

(58) Field of Classification Search
CPC .............. G05B 13/0285; G05B 13/029; G05B 13/0295; G06F 8/35
See application file for complete search history.

(56) References Cited

U.S. PATENT DOCUMENTS

| | | | | |
|---|---|---|---|---|
| 2014/0108100 A1* | 4/2014 | Moriwaki | .......... | G06Q 10/0639 705/7.38 |
| 2015/0148953 A1 | 5/2015 | Laurent et al. | | |
| 2015/0178638 A1* | 6/2015 | Deshpande | ............ | G06N 3/084 706/12 |
| 2015/0332167 A1* | 11/2015 | Kaushal | ............... | G05B 19/418 706/12 |

OTHER PUBLICATIONS

Duffner, Stefan, and Christophe Garcia. "An online backpropagation algorithm with validation error-based adaptive learning rate." International Conference on Artificial Neural Networks. Springer, Berlin, Heidelberg, 2007.*

Mousseau, Vincent, et al. "Resolving inconsistencies among constraints on the parameters of an MCDA model." European Journal of Operational Research 147.1 (2003): 72-93.*

Rätsch, Gunnar, Takashi Onoda, and K-R. Müller. "Soft margins for AdaBoost." Machine learning 42.3 (2001): 287-320.*

Widmer, Gerhard, and Miroslav Kubat. "Learning in the presence of concept drift and hidden contexts." Machine learning 23.1 (1996): 69-101.*

Sheng Uei Guan et al.; Department of Electrical and Computer Engineering, National University of Singapore.; Jan. 10, 2001.

G. Ratsc et al., "Soft Margins for AdaBoost," Journal of Machine Learning. vol. 42, Issue 3, pp. 267-320 Mar. 2001.

M.G.Safonov and T.Tsao, The unfalsified control concept and learning, IEEE Trans. On Autom. Contr., vol. 42, No. 6, pp. 843-847 Jun. 1997.

Mel, Peter; Grance, Timothy; The NIST Definition of Cloud Computing; NIST Special Publication 800-145 Sep. 2011.

* cited by examiner

US 10,664,743 B2

MODELING A SUBJECT PROCESS BY MACHINE LEARNING WITH ADAPTIVE INPUTS

TECHNICAL FIELD

The present disclosure relates to machine learning, and more particularly to methods, computer program products, and systems for predicting data in a series of components in a process subject to analysis.

BACKGROUND

To provide analytical data for a proprietary, and often undisclosed, process such as a manufacturing process including a series of manual subprocesses, a prediction system utilizing machine learning may be employed. An artificial neural network (ANN) using boosting is a commonly employed machine learning method to predict data for a succeeding subprocess based on a limited amount of data from a preceding subprocess. The proprietary process is often analyzed to identify which input influences a specific output the most, which may be modeled by the employed machine learning.

SUMMARY

A method for modeling for a subject process by machine learning with adaptive inputs, comprises: obtaining training data for machine learning, the training data comprising a first input and an output, wherein the first input is at least one measurement from corresponding points of a first subprocess of the subject process and the output is at least one measurement from corresponding points of a second subprocess of the subject process, wherein the first subprocess precedes the second subprocess such that the measurements of the first input respectively influence the measurements of the output within the subject process, and wherein the first input and the output are stored as respective digital data in in a memory coupled to a computer; recording, on at least one location in the memory, a first model generated by use of machine learning with the training data; storing, in the memory, a prediction range calculated by use of values of the first input; in response to ascertaining that a present measurement in the output falls out of the prediction range, adjusting the first model into a second model based on a second input that induces less deviation in the output than the first input such that the second model is more likely to have the output within the prediction range than the first model; and producing, on at least one output device coupled to the computer, the second model as a prediction model for the subject process.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
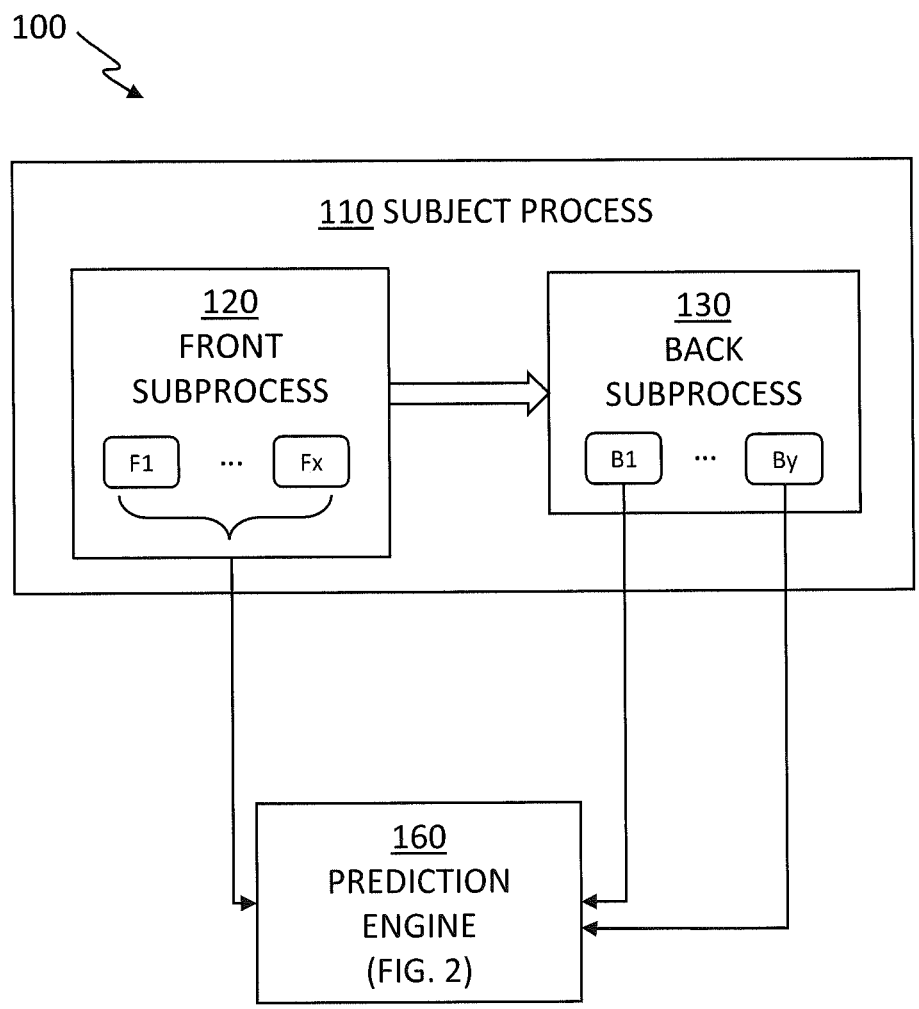
FIG. 1 depicts an adaptively adjustable prediction system for a subject process, in accordance with one or more embodiments set forth herein.

FIG. 1 depicts an adaptively adjustable prediction system for a subject process, in accordance with one or more embodiments set forth herein An adaptively adjustable prediction system 100 includes a subject process 110 and a prediction engine 160. The subject process 110 is a process subject to analysis, including a series of subprocesses including a front subprocess 120 and a back subprocess 130. The front subprocess 120 precedes the back subprocess 130 within the subject process 110, and measurements within the front subprocess 120 may influence measurements within the back subprocess 130. The measurements are data sampled from various points of the front subprocess 120 and the back subprocess 130, to provide basis for the prediction engine 160.

The prediction engine 160 is a set of computer programs to estimate data in the back subprocess 130 as an output based on data in the front subprocess 120 as inputs, to adjust the inputs that induce a deviation in the output greater than a predefined limit, and to provide results whether or not the data in the back subprocess 130 behaves predictably within the subject process 110. The front subprocess 120 and the back subprocess 130 may not have a relationship that could be analyzed with a linear model within the subject process 110 and, consequently, may require a modeling suitable for an environment characterized by manually measured data having a deviation greater than in case of a standard distribution. Wherein the prediction engine 160 generates an estimate for the back subprocess 130 that is not close enough to actual measurements of the back subprocess 130, such output is deemed "falsified" and the prediction engine 160 is adjusted. See description of FIGS. 2, 3, and 4, for details of the prediction engine 160. The prediction engine 160 is an instance of program/utility 40 of FIG. 5.

In one embodiment of the present invention, the prediction engine 160 employs an artificial neural network (ANN) as a non-linear model, and a machine learning method using a boosting algorithm, referred to as "Adaptive Boosting", or "AdaBoost", that is developed by Schapire and Freund. The ANN and the machine learning by boosting are utilized in modeling the prediction engine 160 with the inputs and respective outputs, predicting outputs for the back subprocess 130, and adjusting the prediction engine 160 to remove an input responsible for an output having a corresponding deviation greater than the predefined limit. As the machine learning by boosting based on the ANN is employed as an encapsulated tool for the prediction engine 160 controlled by input and/or output feed, no further description of the machine learning by boosting and/or the ANN is provided in this specification. Although there are available computerized implementations of boosting algorithms, for example, Ada-Boost, such solutions do not properly model the relationships between inputs from the preceding subprocess and the outputs for the succeeding subprocess when data provided for the modeling deviates more than a predefined level. As data acquired from manual processes inherent to the analyzed process, such as manual measurement of shapes and sizes, tend to deviate more than other types of modeling data, a modeling technique for predicting outputs needs to take the level of deviation for data into account to properly model data with greater deviation.

In one embodiment of the present invention, the subject process 110 is an automobile manufacturing process; the front subprocess 120 and the back subprocess 130 are two consecutive subprocesses in an ordered segment of the subject process 110, wherein the front subprocess 120 precedes the back subprocess 130; x number of measurements from the front subprocess 120, {F1, ..., Fx}, and y number of measurements from the back subprocess 130, {B1, ..., By}, are provided for the prediction engine 160 as training data for machine learning. Further, in the same embodiment of the present invention, x and y are identical positive integers and the prediction engine keeps a one-to-one correspondence from a second measurement from the back subprocess 130 to a first measurement from the front subprocess 120, indicating that the first measurement is responsible for the second measurement.

Figure 2:
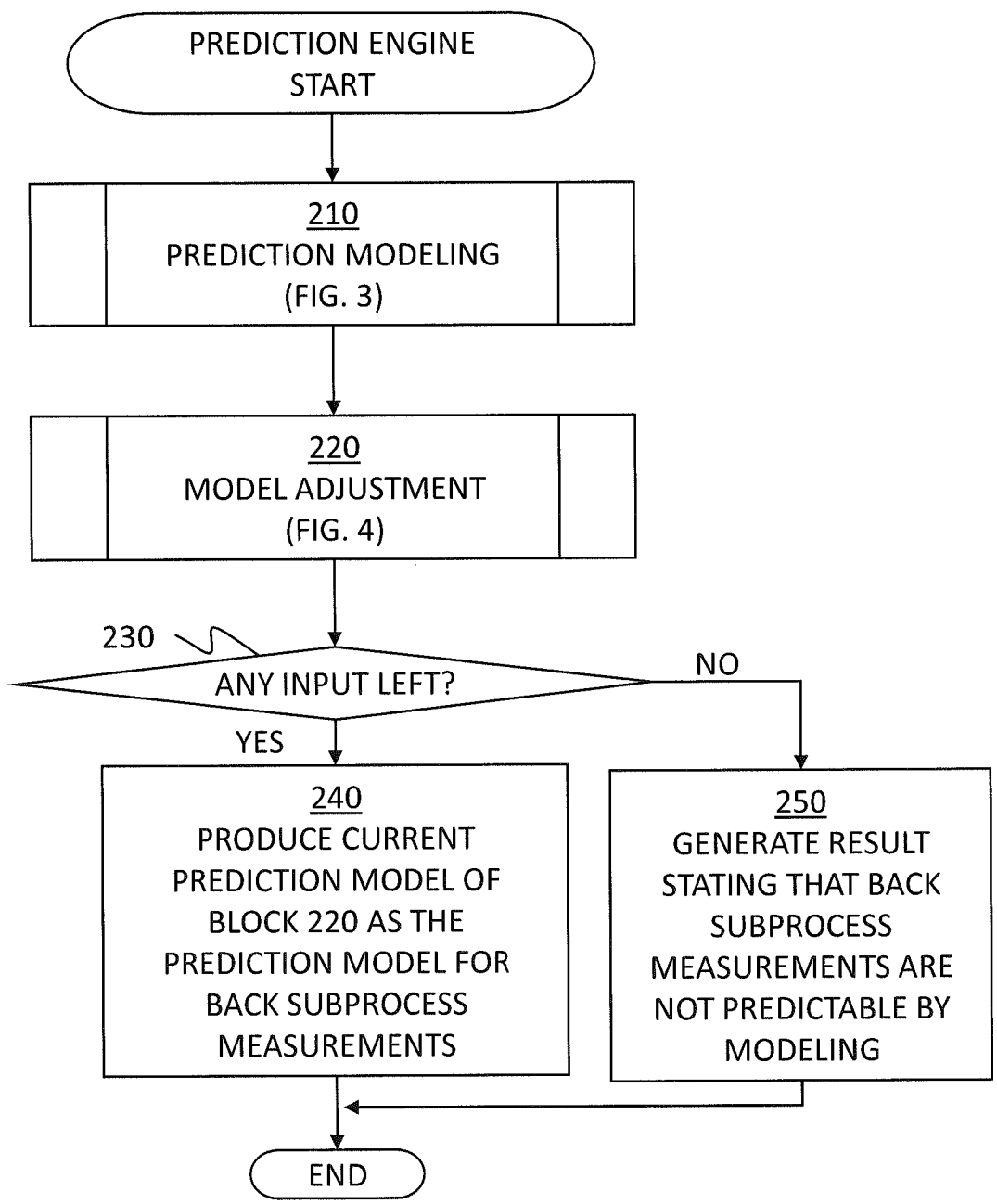
FIG. 2 depicts a flowchart for the prediction engine of the adaptively adjustable prediction system, in accordance with one or more embodiments set forth herein.

FIG. 2 depicts a flowchart for the prediction engine of the adaptively adjustable prediction system, in accordance with one or more embodiments set forth herein.

In block 210, the prediction engine 160 initially models the two consecutive subprocesses of the subject process 110, the front subprocess 120 and the back subprocess 130, based on the measurements from the front subprocess 120 and the back subprocess 130, to predict data in the back subprocess 130. See description of FIG. 3 for details of the prediction modeling phase.

Figure 3:
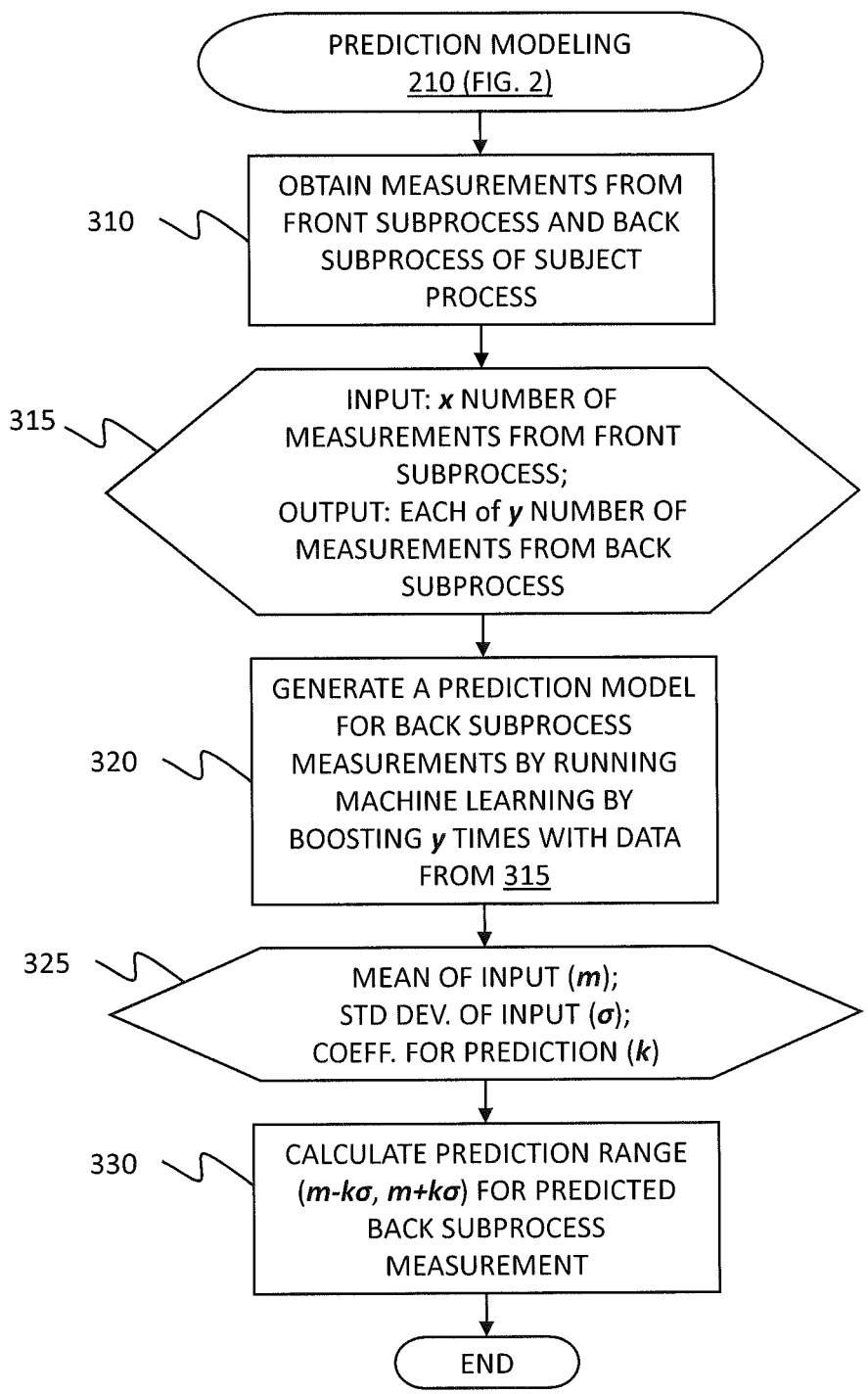
FIG. 3 depicts a flowchart for a prediction modeling phase of the prediction engine, in accordance with one or more embodiments set forth herein.

In block 220, the prediction engine 160 repeatedly adjusts the prediction model of block 210 by examining each prediction against an actual measurement corresponding to the prediction, and by removing an input responsible for a prediction that is not within the range set in block 330 of FIG. 3. See description of FIG. 4 for details of the model adjustment phase.

In block 230, the prediction engine 160 determines whether or not there is any input left after the model adjustment of block 220. If the prediction engine 160 determines that there is input left for the current prediction model, then the prediction engine proceeds with block 240, in which the prediction engine 160 produces the current prediction model of block 220 as the prediction model for measurements of the back subprocess 130.

In block 230, if the prediction engine 160 determines that there is no input left for the current prediction model, then the prediction engine 160 proceeds with block 250, in which the prediction engine 160 generates a result stating that the back subprocess measurements are not predictable by the ANN-boosting modeling employed by prediction engine 160. Once the prediction engine 160 either produces the prediction model or generates the result that no predictable modeling is available for the subject process, then the prediction engine 160 terminates.

FIG. 3 depicts a flowchart for a prediction modeling phase 210 of FIG. 2 of the prediction engine, in accordance with one or more embodiments set forth herein.

In block 310, the prediction engine 160 obtains measurements from the front subprocess 120 and the back subprocess 130 of the subject process 110 to be analyzed. The measurements from the front subprocess 120 and the back subprocess 130 are manually measured data at various checkpoints during respective subprocess, and due to the nature of the measurement, the data values tend to deviate more than other statistical distribution. The measurements from the front subprocess 120 and the back subprocess 130 are training data to teach a machine learning algorithm how to generate outputs corresponding to the measurements from the back subprocess 130, provided inputs corresponding to the measurements from the front subprocess 120. The prediction engine 160 proceeds with block 320.

In block 320, the prediction engine 160 generates a prediction model. Block 315 indicates a preparation for block 320, in which the prediction engine 160 uses all x number of measurements from the front subprocess 120 and one measurement from y number of measurements the back subprocess 130 for each run of y number of machine learning runs. The resulting prediction model generates an output that is a prediction and/or estimate of a measurement in the back subprocess 130 based on all available measurements from the front subprocess 120 as input. The prediction engine 160 proceeds with block 330.

In block 330, the prediction engine 160 calculates a range acceptable for the output of the prediction model. Block 325 indicates a preparation for block 330, in which the prediction engine 160 calculates: the mean (m) of inputs, that is, all x number of measurements from the front subprocess 120; the standard deviation ($\sigma$) of the inputs; and a coefficient (k) for prediction, that will determine the range. Consequently, the calculated prediction range is (m−k$\sigma$, m+k$\sigma$) indicating that wherein the output, prediction of the back subprocess measurement, does not deviate greater than or equal to k-times of the standard input deviation, then the prediction is acceptable and the prediction model is not falsified. According to the range estimation for the prediction model rather than a point estimation, the prediction range is determined by use of Chebyshev's Inequality, also referred to as Chebyshev's theorem, Tchebysheff's inequality, which guarantees that in any probability distribution, most of all values are close to the mean, and a probability of the prediction point being k-times away from the standard deviation of input with the output of ANN-boosting as the center is equal to or less than $(1/(k^2))$. The range estimation is particularly effective in cases where the number of data provided for the modeling/learning is limited, in which the point estimation generates only an approximation, and Gaussian distribution may not be applied to errors of the estimated points. The value of coefficient k is determined based on the characteristics of the subject process 110, requirements of the analysis, etc. In one embodiment of the present invention, the value of k is 3. The prediction engine 160 concludes the prediction modeling phase and proceeds with block 220 of FIG. 2, which is detailed in FIG. 4.

Figure 4:
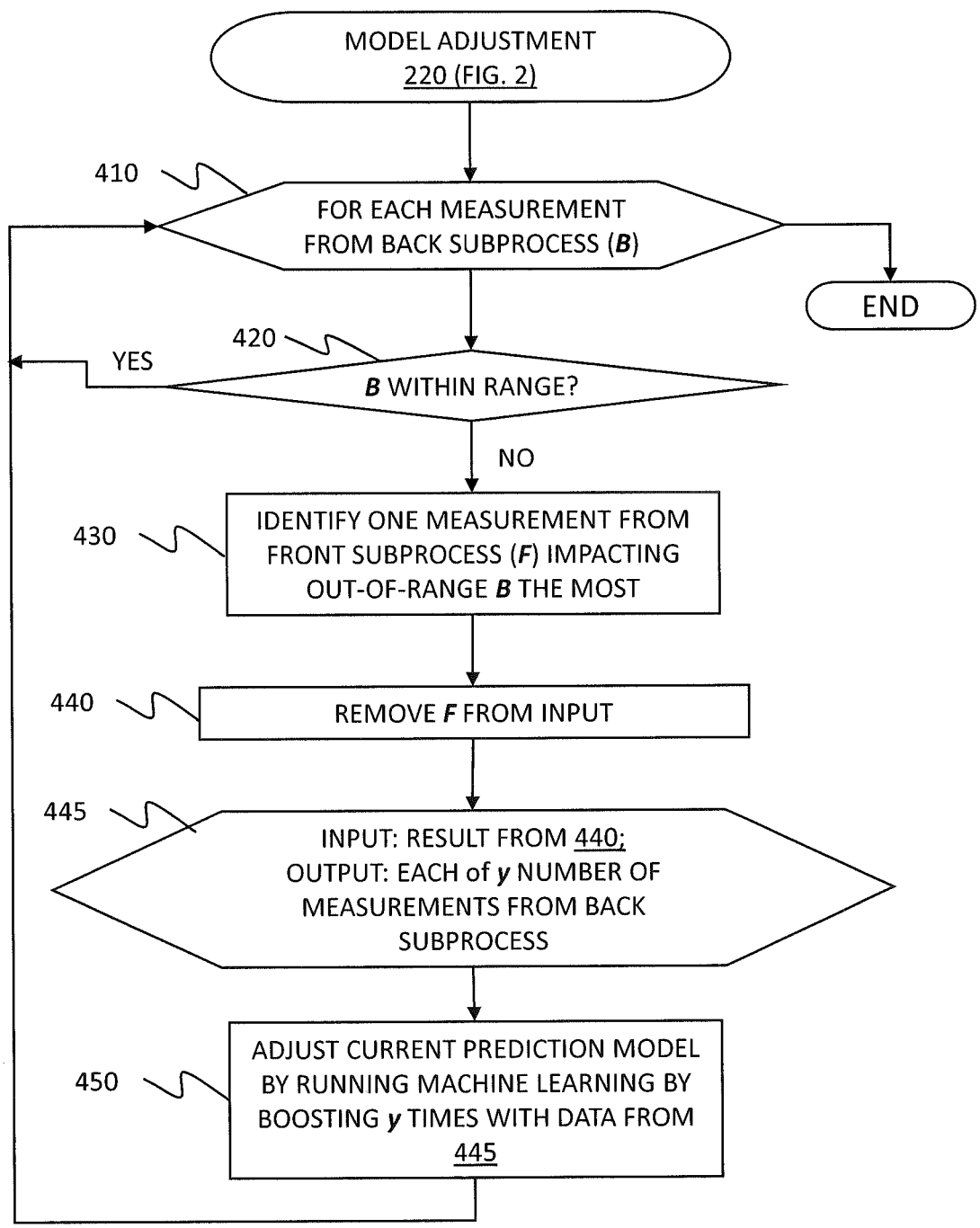
FIG. 4 depicts a flowchart for a model adjustment phase of the prediction engine, in accordance with one or more embodiments set forth herein.

FIG. 4 depicts a flowchart for a model adjustment phase of the prediction engine, in accordance with one or more embodiments set forth herein.

Block 410 indicates that the prediction engine 160 performs blocks 420 through 450 for each measurement from the back subprocess 130, a present measurement of the back subprocess 130, denoted as B. B is selected from {B1, ..., By}, in an orderly fashion such that each measurement from the back subprocess 130 is examined once. When the model adjustment phase runs for the first time, a current prediction model is the prediction model generated from block 320 of FIG. 3. The current prediction model is replaced with the adjusted prediction model from block 450, wherein the prediction engine 160 performs block 450. Once blocks 420 through 450 are performed y number of times, for all measurements from the back subprocess 130, the prediction engine 160 concludes the model adjustment phase and proceeds with block 230 of FIG. 2.

In block 420, the prediction engine 160 determines whether or not the current prediction model of block 210 is falsified by comparing an output of the prediction model, the prediction range (m−kσ, m+kσ), with the present measurement of the back subprocess (B) identified from block 410. If the present measurement of the back subprocess (B) falls within the prediction range (m−kσ, m+kσ), then the prediction engine 160 loops back to block 410 for a next measurement of the back subprocess 130. If the present measurement of the back subprocess (B) does not fall within the prediction range (m−kσ, m+kσ), then the prediction engine 160 proceeds with block 430.

In block 430, the prediction engine 160 identifies a measurement from the front subprocess 120, denoted as F, which contributes the most to the present measurement of the back subprocess (B) being out-of-range. In one embodiment of the present invention, each B corresponds back to respective F by one-to-one mapping such that the measurement on the side of the front subprocess 120 that is responsible for the out-of-range B is traceable. In another embodiment of the present invention, the prediction engine 160 examines the mean (m), and the standard deviation (σ) of the learning data in block 315 of FIG. 3. Then the prediction engine 160 proceeds with block 440.

In block 440, the prediction engine 160 removes the measurement from the front subprocess (F) identified in block 430 from the input of the current prediction model. Then the prediction engine 160 proceeds with block 450.

In block 450, the prediction engine 160 adjusts the current prediction model by running the machine learning by boosting algorithm y times, resulting in an adjusted prediction model. The adjusted prediction model of block 450 becomes the current prediction model in next cycle of blocks 420 through 450 for the next back subprocess measurement. Block 445 indicates a preparation for block 450, in which the prediction engine 160 uses (x−1) number of measurements from the front subprocess 120 as input, that are the input of the current prediction model having x number of measurement(s) less F as identified in block 430, and one measurement from y number of measurements of the back subprocess 130 for each run of y number of machine learning runs of block 450. Then the prediction engine 160 loops back to block 410 for the next back subprocess measurement.

Figure 5:
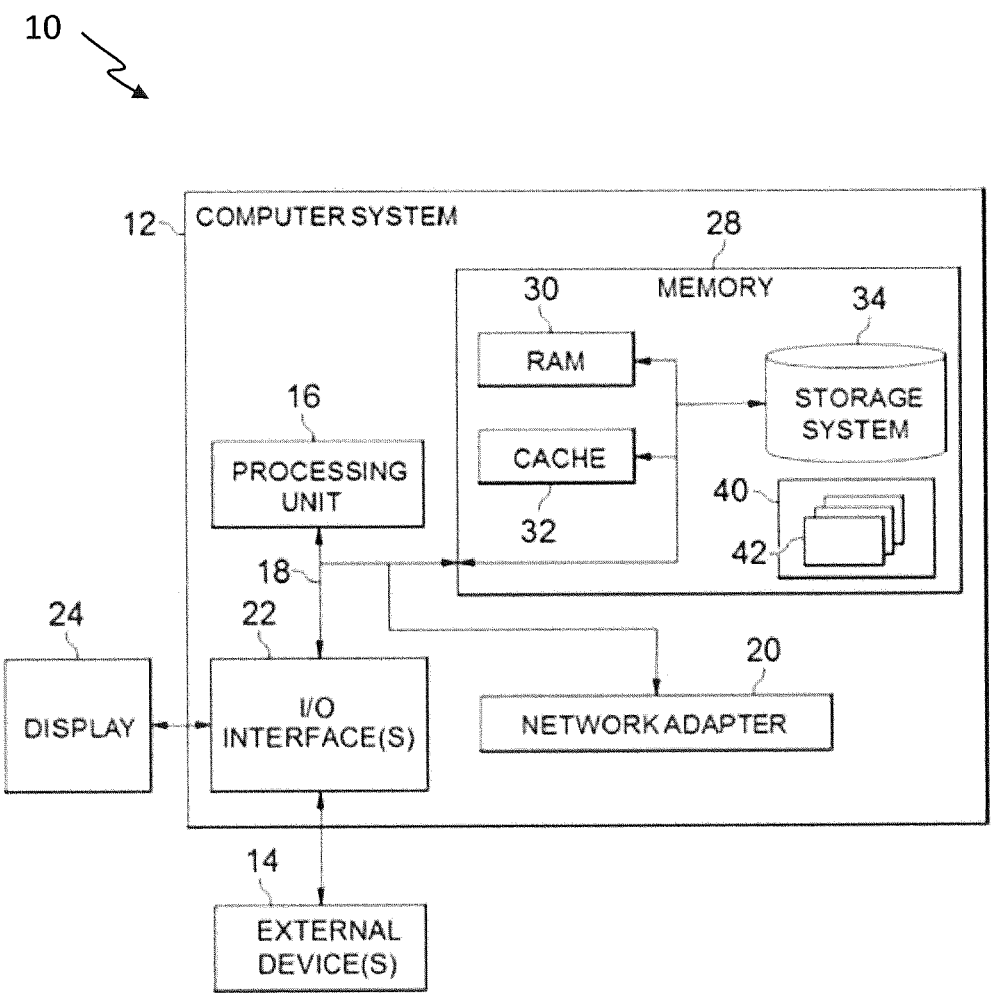
FIG. 5 depicts a cloud computing node according to an embodiment of the present invention.
Figure 6:
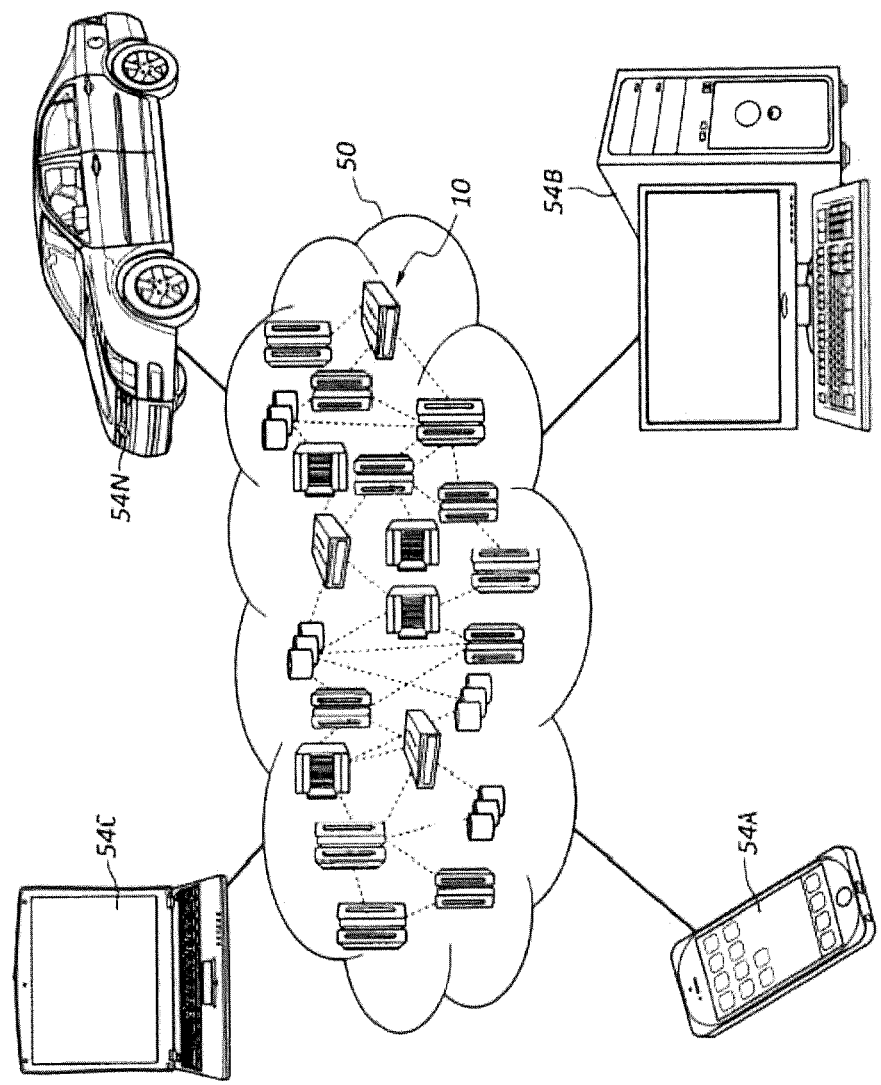
FIG. 6 depicts a cloud computing environment according to an embodiment of the present invention.
Figure 7:
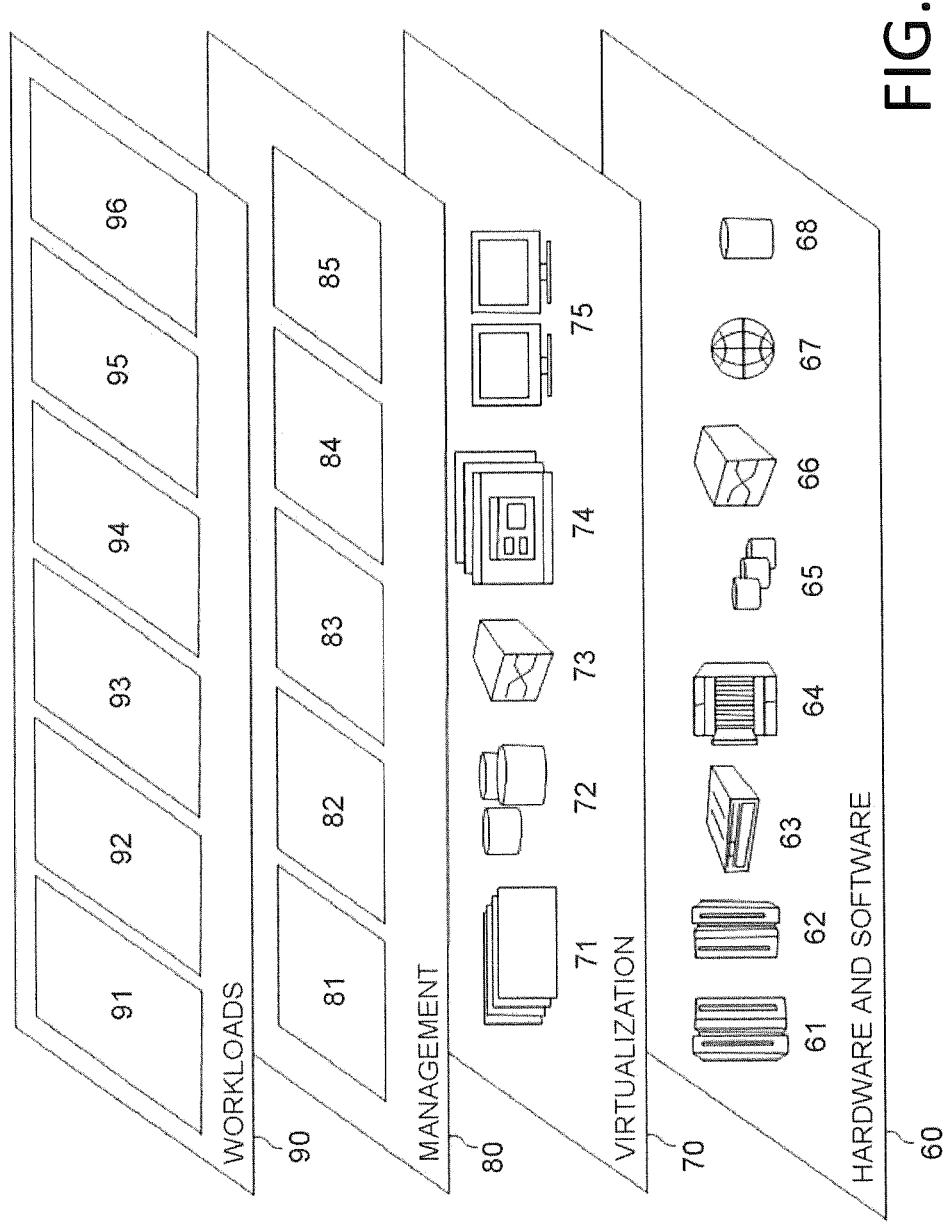
FIG. 7 depicts abstraction model layers according to an embodiment of the present invention.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an adaptively adjustable prediction system processing 96 as described herein.

Program/utility 40 as set forth in FIG. 5 can provide the functionality of an adaptively adjustable prediction system processing 96 as set forth in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
   a memory;
   one or more processor in communication with the memory; and
      program instructions executable by the one or more processor via the memory to perform a method for modeling for a subject process by machine learning with adaptive inputs, comprising:
      obtaining training data for machine learning, the training data comprising a first input and an output, wherein the first input is at least one measurement from a first subprocess of the subject process and the output is at least one measurement from a second subprocess of the subject process, wherein the first subprocess precedes the second subprocess such that measured values of the first input respectively influence measured values of the output within the subject process, and wherein the first input and the output are stored as respective digital data in the memory coupled to a computer;
      recording, on at least one location in the memory, a first model generated by use of machine learning with the training data;
      storing, in the memory, a prediction range calculated by use of values of the first input;
   in response to ascertaining that a present measurement in the output falls out of the prediction range, adjusting the first model into a second model based on a second input, wherein the second input does not include a measurement from the first subprocess that influences the present measurement from the second subprocess, said adjusting comprising determining that a present measurement in the output falls out of the prediction range, identifying a first measurement of the input that contributes the greatest to the first measurement among all measurements, rendering the second input by removing, from the first input, the identified first measurement, such that the second input is free from a bias causing the present measurement of the output to fall out of the prediction range, logging, in the memory, the rendered second input, running, in the computer, a machine learning algorithm y times, wherein y is a positive integer identical to a number of measurements of the output, respectively with the logged second input and each measurement of the output to generate the second model that is capable of deriving each measurement of the output from the second input; and writing, in the memory, the second model from said running; and producing, on at least one output device coupled to the computer, the second model as a prediction model for the subject process.

2. The system of claim 1:
said recording the first model comprising:
running, in the computer, a machine learning algorithm y times, wherein y is a positive integer identical to the number of measurements of the output, respectively with the first input and each measurement of the output to generate the first model that is capable of deriving each measurement of the output from the first input; and wherein calculating the prediction range by use of values of the first input comprises:
calculating a mean value of the first input (m), and a standard deviation of the first input ($\sigma$);
determining a positive integer k configuring how much deviation is permitted for the prediction range; and
calculating the prediction range as (m−k$\sigma$, m+k$\sigma$);
said adjusting comprising:
determining that a present measurement in the output falls out of the stored prediction range;
identifying a first measurement of the input that contributes the greatest to the present measurement among all measurements;
rendering the second input by removing, from the first input, the identified first measurement, such that the second input is free from a bias causing the present measurement of the output to fall out of the prediction range;
logging, in the memory, the rendered second input;
running, in the computer, a machine learning algorithm y times, wherein y is a positive integer identical to the number of measurements of the output, respectively with the logged second input and each measurement of the output to generate the second model that is capable of deriving each measurement of the output from the second input; and
writing, in the memory, the second model from said running;
said producing comprising:
ascertaining both that the second input has at least one measurement and that the output comprising all measurements corresponding to y number of points from the second subprocess falls within the prediction range when run by the second model; and
presenting, on the at least one output device, the second model as an adaptively adjusted prediction model for the output within the subject process.

3. The system of claim 1, wherein the subject process is a manufacturing process, and wherein the at least one measurement from the first subprocess comprises a manual measurement of a shape or size of an object.

4. The system of claim 1, wherein the method includes identifying a first measurement of the input responsible for the present measurement having fallen out of the prediction range; removing, from the first input, the identified first measurement, such that the second input is free from a bias causing the present measurement of the output to fall out of the prediction range.

5. The system of claim 1, wherein the subject process is a manufacturing process, and wherein the at least one measurement from the first subprocess comprises a manual measurement of a shape or size of an object, wherein the method includes identifying a first measurement of the input responsible for the present measurement having fallen out of the prediction range and removing, from the first input, the identified first measurement, such that the second input is free from a bias causing the present measurement of the output to fall out of the prediction range.

6. The system of claim 1, wherein the method includes using the first model to generate a predicted value for the present measurement, and using the predicted value for the present measurement to determine the prediction range.

7. The system of claim 1, wherein the method includes using the first model to generate a predicted value for the present measurement, and using the predicted value for the present measurement to determine the prediction range, wherein the subject process is a manufacturing process, and wherein the at least one measurement from the first subprocess comprises a manual measurement of a shape or size of an object, wherein the method includes identifying a first measurement of the input responsible for the present measurement having fallen out of the prediction range and removing, from the first input, the identified first measurement, such that the second input is free from a bias causing the present measurement of the output to fall out of the prediction range.

8. The system of claim 1, said recording the first model comprising:
running, in the computer, a machine learning algorithm y times, wherein y is a positive integer equal to the number of measurements of the output, respectively with the first input and each measurement of the output to generate the first model that is capable of deriving each measurement of the output from the first input; and
writing, in the memory, the first model from said running.

9. The system of claim 1, wherein calculating the prediction range by use of values of the first input comprises:
calculating a mean value of the first input (m), and a standard deviation of the first input ($\sigma$);
determining a positive integer k configuring how much deviation is permitted for the prediction range; and
calculating the prediction range as (m−k$\sigma$, m+k$\sigma$).

10. The system of claim 1, said adjusting comprising:
determining that a present measurement in the output falls within the stored prediction range;
updating the present measurement with a next measurement the output for which a corresponding determination of whether the next measurement is within the prediction range has not yet been made; and
iterating said adjusting with the updated present measurement.

11. The system of claim 1, said producing comprising:
ascertaining both that the second input has at least one measurement and that the output comprising all measurements corresponding to y number of points from the second subprocess falls within the prediction range when run by the second model; and presenting, on the at least one output device, the second model as an adaptively adjusted prediction model for the output within the subject process.

12. A method for modeling for a subject process by machine learning with adaptive inputs, comprising:

obtaining training data for machine learning, the training data comprising a first input and an output, wherein the first input is at least one measurement from a first subprocess of the subject process and the output is at least one measurement from a second subprocess of the subject process, wherein the first subprocess precedes the second subprocess such that measured values of the first input respectively influence measured values of the output within the subject process, and wherein the first input and the output are stored as respective digital data in a memory coupled to a computer;

recording, on at least one location in the memory, a first model generated by use of machine learning with the training data;

storing, in the memory, a prediction range calculated by use of values of the first input;

in response to ascertaining that a present measurement in the output falls out of the prediction range, adjusting the first model into a second model based on a second input, wherein the second input does not include a measurement from the first subprocess that influences the present measurement from the second subprocess, said adjusting comprising determining that a present measurement in the output falls out of the prediction range, identifying a first measurement of the input that contributes the greatest to the first measurement among all measurements, rendering the second input by removing, from the first input, the identified first measurement, such that the second input is free from a bias causing the present measurement of the output to fall out of the prediction range, logging, in the memory, the rendered second input, running, in the computer, a machine learning algorithm y times, wherein y is a positive integer identical to a number of measurements of the output, respectively with the logged second input and each measurement of the output to generate the second model that is capable of deriving each measurement of the output from the second input; and writing, in the memory, the second model from said running; and producing, on at least one output device coupled to the computer, the second model as a prediction model for the subject process.

13. The method of claim 12, said recording the first model comprising:

running, in the computer, a machine learning algorithm y times, wherein y is a positive integer equal to the number of measurements of the output, respectively with the first input and each measurement of the output to generate the first model that is capable of deriving each measurement of the output from the first input; and writing, in the memory, the first model from said running.

14. The method of claim 12, wherein calculating the prediction range by use of values of the first input comprises:

calculating a mean value of the first input (m), and a standard deviation of the first input ($\sigma$);

determining a positive integer k configuring how much deviation is permitted for the prediction range; and calculating the prediction range as (m−k$\sigma$, m+k$\sigma$).

15. The method of claim 14, wherein k=3 and the prediction range for the output is (m−3$\sigma$, m+3$\sigma$), dictating the prediction model to predict measurements of the output having less than three (3) times of the standard deviation of the first input from the mean of the first input.

16. The method of claim 12, said adjusting comprising:

determining that a present measurement in the output falls within the stored prediction range;

updating the present measurement with a next measurement the output for which a corresponding determination of whether the next measurement is within the prediction range has not yet been made; and iterating said adjusting with the updated present measurement.

17. The method of claim 12, said producing comprising:

ascertaining both that the second input has at least one measurement and that the output comprising all measurements corresponding to the y number of points from the second subprocess falls within the prediction range when run by the second model; and presenting, on the at least one output device, the second model as an adaptively adjusted prediction model for the output within the subject process.

18. The method of claim 12, said producing comprising:

ascertaining that the second input is empty indicating that all measurements from the first input had been removed by at least x number of repetitions of said adjusting, wherein x is a positive integer equal to the number of measurements of the first input; and presenting, on the at least one output device, a report stating that the measurements of the second process of the subject process may not be predicted by modeling using machine learning.

19. The method of claim 12, wherein the generated first model is an artificial neural network model and the machine learning employed is adaptive boosting.

20. A computer program product comprising:

a computer readable storage medium readable by one or more processing circuit and storing instructions for execution by one or more processor for performing a method for modeling for a subject process by machine learning with adaptive inputs, comprising:

obtaining training data for machine learning, the training data comprising a first input and an output, wherein the first input is at least one measurement from a first subprocess of the subject process and the output is at least one measurement from a second subprocess of the subject process, wherein the first subprocess precedes the second subprocess such that measured values of the first input respectively influence measured values of the output within the subject process, and wherein the first input and the output are stored as respective digital data in a memory coupled to a computer;

recording, on at least one location in the memory, a first model generated by use of machine learning with the training data;

storing, in the memory, a prediction range calculated by use of values of the first input;

in response to ascertaining that a present measurement in the output falls out of the prediction range, adjusting the first model into a second model based on a second input, wherein the second input does not include a measurement from the first subprocess that influences the present measurement from the second subprocess, said adjusting comprising determining that a present measurement in the output falls out of the prediction range, identifying a first measurement of the input that contributes the greatest to the first measurement among all measurements, rendering the second input by removing, from the first input, the identified first measurement, such that the second input is free from a bias causing the present measurement of the output to fall out of the prediction range, logging, in the memory, the rendered second input, running, in the computer, a machine learning algorithm y times, wherein y is a positive integer identical to a number of measurements of the output, respectively with the logged second input and each measurement of the output to generate the second model that is capable of deriving each measurement of the output from the second input; and writing, in the memory, the second model from said running; and producing, on at least one output device coupled to the computer, the second model as a prediction model for the subject process.

\* \* \* \* \*